United States Patent [19]

Murakami

[11] Patent Number: 4,900,485
[45] Date of Patent: Feb. 13, 1990

[54] METHOD AND APPARATUS FOR TRANSFER MOLDING

[75] Inventor: Yoji Murakami, Fukushima, Japan

[73] Assignee: Fujitsu Limited, Kawasaki, Japan

[21] Appl. No.: 222,391

[22] Filed: Jul. 21, 1988

Related U.S. Application Data

[63] Continuation of Ser. No. 884,885, Jul. 11, 1986, abandoned, which is a continuation of Ser. No. 592,069, Mar. 22, 1984, abandoned.

[30] Foreign Application Priority Data

Mar. 31, 1983 [JP] Japan ................................ 58-055861

[51] Int. Cl.⁴ ........................................... B29C 45/02
[52] U.S. Cl. ............................. 264/40.1; 264/272.13; 264/272.17; 264/328.5; 425/116; 425/121; 425/129.1; 425/145; 425/149
[58] Field of Search ............. 264/40.1, 272.13, 272.17, 264/328.5; 425/149, 121, 129.1, 116, 145

[56] References Cited

FOREIGN PATENT DOCUMENTS 637097 2/1962 Canada .......................... 264/272.13

Primary Examiner—James Lowe
Attorney, Agent, or Firm—Staas & Halsey

[57] ABSTRACT

A transfer molding method and apparatus in which the internal pressure of a thermosetting resin in a mold is directly detected and is controlled constantly during the transfer molding.

18 Claims, 4 Drawing Sheets

METHOD AND APPARATUS FOR TRANSFER MOLDING

This is a continuation of U.S. application Ser. No. 884,885, filed July 11, 1986, now abandoned, which was a continuation of U.S. Ser. No. 592,069, filed March 22, 1984, now abandoned.

BACKGROUND OF THE INVENTION

1. Field of the Invention

The present invention relates to a transfer molding process and an apparatus to carry out the process and, more particularly, to a transfer molding method and apparatus used for mold-sealing semiconductor devices.

2. Description of the Prior Art

Semiconductor devices such as transistors, integrated circuits (IC), and large-scale integrated circuits (LSI) are sealed for protection against changes in temperature, humidity, and other external conditions, and against breakage or changes in inherent characteristics due to mechanical vibration, shock, etc. In current practice, semiconductor devices are hermetically sealed using either metal and ceramic materials or plastic packages composed of thermosetting resins such as epoxy or silicone. Of these, the plastic package method is predominant.

In the plastic package method, a transfer molding apparatus is used. A lead frame bearing a semiconductor chip is placed in a cavity of a mold, then molten resin is charged and injected into the mold under a constant pressure by a plunger operated by a hydraulic device or the like.

During this method, however, the pressure of the resin as it enters the cavity decreases due to leakage or friction between the mold and the plunger. This decrease in pressure results in voids and other defects inside the product and a poor surface quality of the product.

To overcome this problem, conventional practice is to effect the transfer molding manually, i.e., to have an operator control the pressure of the resin to maintain a constant level. This method, however, lowers productivity.

SUMMARY OF THE INVENTION

An object of the present invention is to provide a transfer molding method and apparatus in which pressure loss generated by leakage or friction between a mold and an injection means is automatically detected and compensated for. According to a preferred embodiment of the present invention, there is provided a transfer molding method for molding resin articles in a mold having a plurality of cavities and a pot communicating with the cavities, the method comprising the steps of: charging a thermosetting resin into the pot, transferring the thermosetting resin from the pot to each of the cavities by applying a pressure to the thermosetting resin by means of a plunger movable in the pot, detecting an internal pressure in the pot directly by detecting means, and controlling the pressure applied to the plunger means in response to the internal pressure detected by the detecting means so that the internal pressure in the pot is substantially constant during the transferring step.

According to another embodiment of the present invention, there is provided a transfer molding apparatus comprising: a mold having a plurality of cavities and a pot, the pot communicating with each of the cavities; plunger means movable in the pot for pressing a thermosetting resin charged into the pot; driving means for applying a pressure to the plunger means; detecting means for detecting an internal pressure in the pot directly and generating a signal corresponding to the internal pressure; and control means for controlling the pressure applied to the plunger means by the driving means in response to the signal from the detecting means for keeping the internal pressure substantially constant during transfer of the thermosetting resin from the pot to each of the cavities.

DETAILED DESCRIPTION OF THE PREFERRED EMBODIMENTS

Figure 1:
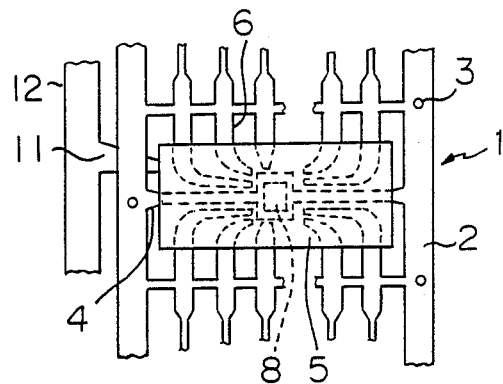
FIG. 1 is a plan view of a lead frame provided in a cavity.
Figure 2:
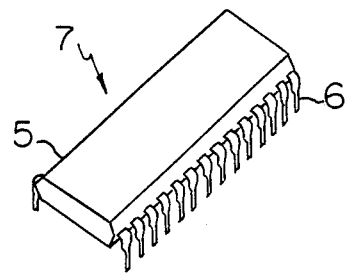
FIG. 2 is a perspective view of a mold-sealed type semiconductor device.

Before describing the preferred embodiments of the present invention an explanation will be given of the prior art for reference. Referring to FIG. 1, in the formation of a mold package 5, a lead frame 1, which bears a semiconductor chip 8 wire bonded thereto, is placed in a cavity provided in a mold. Molten resin, such as a thermosetting resin obtained by melting pellets, is injected under pressure into the cavity through a runner 12 and a gate 11 of a lower mold. After molding, the leads 6 of the package 5 are separated from the lead frame 1 and bent to the required shape. As a result, a mold-sealed type semiconductor device 7 as shown in FIG. 2 is formed. Now, in FIG. 1, reference numerals 2, 3, and 4 represent a cradle, a pilot aperture, and pinch, respectively.

Figure 3:
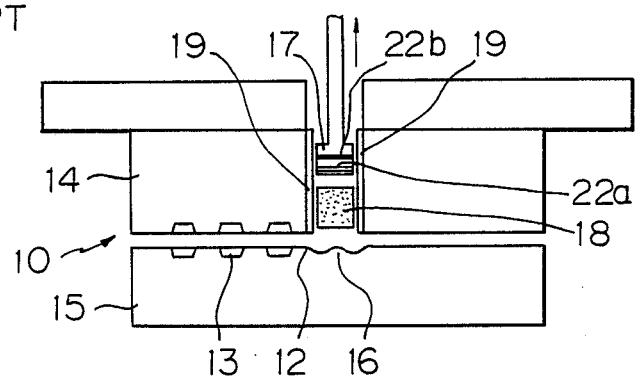
FIG. 3 is a schematic cross-sectional view of a transfer molding apparatus.

FIG. 3 is a schematic cross-sectional view of a transfer molding apparatus used in the above process. In FIG. 3, reference numeral 10 represents a mold consisting of: a top half 14 and a bottom half 15; 12 a runner; 13 a cavity, 16 a cull which receives molten resin; 17 an injection plunger which presses resin pellets 18 (hereinafter referred to as merely resin;), 19 a pot in which the injection plunger 17 carries out up-down movement; and 22a and 22b a lower groove and upper groove, respectively. FIG. 3 shows only three cavities 13, however, in fact, about 10 to 200 cavities are provided in a mold.

In such a molding apparatus, the resin 18 is melted by the heat from the mold 10, which has been heated to about 180° C., and by the pressure generated by the descent of the injection plunger 17 due to a driving device, for example, hydraulic device (not shown). The molten resin 18 is fed within the cavities 13 through the cull 16, runner 12, and a gate (not shown). When the molten resin 18 fills all cavities 13, the injection plunger 17 returns upward to complete one stroke.

The descent pressure of the injection plunger 17 is maintained at, for example, 60 kg/cm² to ensure complete filling of the cavities by the molten resin 18. The actual pressure of the resin 18, however, often does not remain at the predetermined level due to leakage of the molten resin between the injection plunger 17 and the inner wall of the pot 19, etc. This results in the various problems discussed above.

Figure 4:
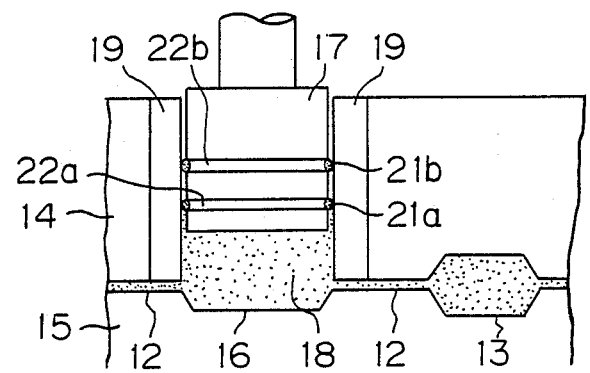
FIG. 4 is a schematic cross-sectional view of a portion of the transfer molding apparatus, including an injection plunger.

FIG. 4 is a schematic cross-sectional view of the portion of the transfer molding apparatus including the above injection plunger 17. FIG. 4 shows the small space between the injection plunger 17 and the pot 19. When pressure is applied to the molten resin 18 by the descending injection plunger 17, some resin 18 enters the above space, thereby reducing the pressure.

Conventionally, to prevent the pressure loss, two grooves 22a and 22b are provided on the outer circumference of the injection plunger 17. Resin entering the space fills the lower groove 22a first. Since the resin is thermosetting, it hardens after the stroke to a close fit against the wall of the pot 19, thus forming an O-ring-shaped portion 21a. This O-ring-shaped portion 21a prevents much of the resin leakage in later strokes. Any resin leaking beyond the O-ring-shaped portion 21a fills the groove 22b to form an O-ring-shaped portion 21b. The double-sealing effect of the two grooves 22a and 22b in the injection plunger 17 effectively prevents resin leakage. At the same time, however, friction between the O-ring-shaped portions 21a and 21b in the grooves 22a and 22b and the wall of the pot 19 decreases the pressure applied to the resin 18 by the injection plunger 17.

Figure 5:
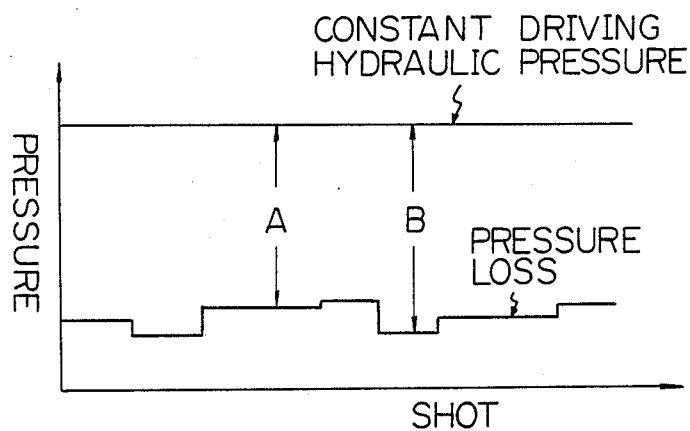
FIG. 5 is a diagram of the relationship between pressures of the resin and the number of shots of resin according to the prior art.

The relationship between the pressure loss and the number of shots, i.e., the number of injections of resin, is illustrated in FIG. 5. In FIG. 5 the pressures A and B are actual pressures of the resin per shot, corresponding to the difference between the fluctuating pressure loss and constant driving hydraulic pressure, e.g., 60 kg/cm². In the prior art, the pressures A and B have not been controlled to a constant level.

Figure 6:
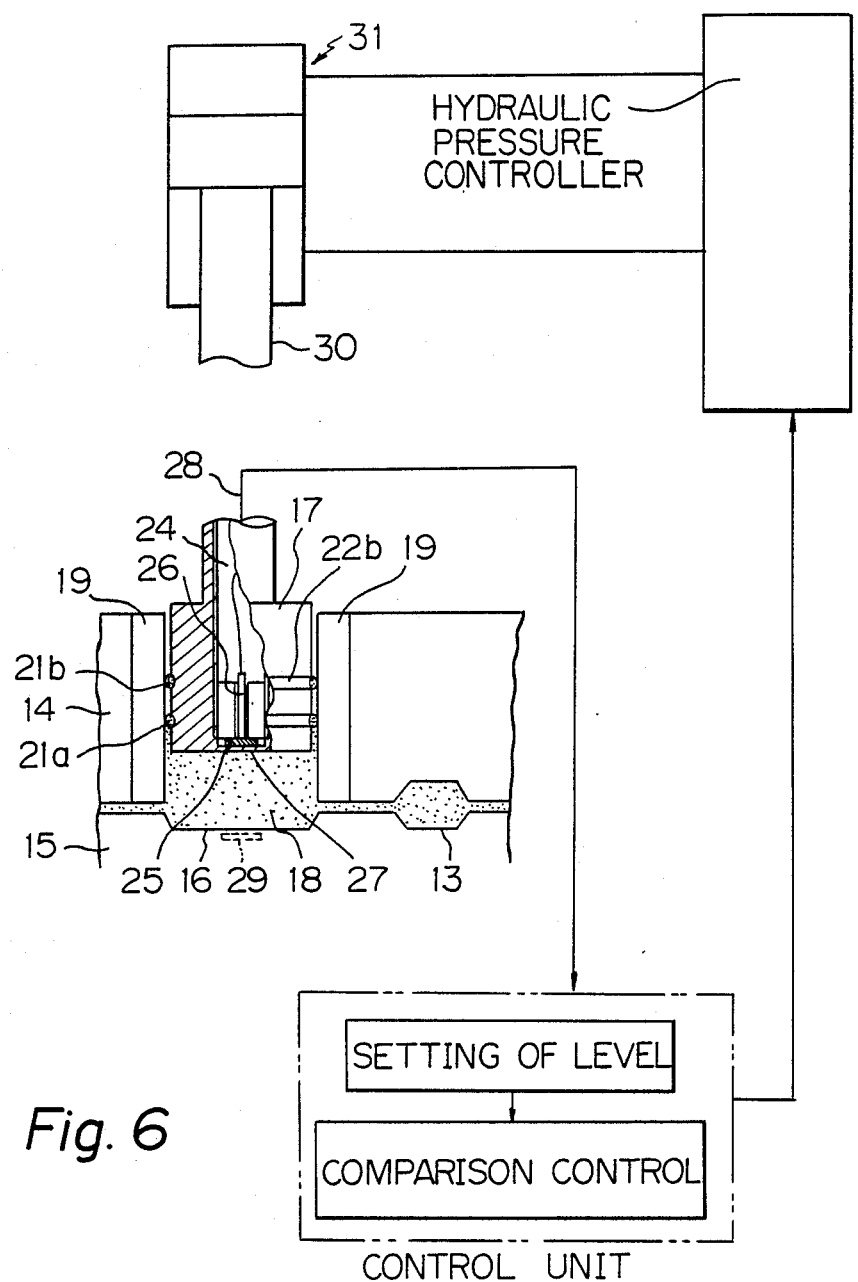
FIG. 6 is a schematic view of an automatic transfer molding apparatus, according to the present invention.

FIG. 6 is a schematic view of an automatic transfer molding apparatus, according to a preferred embodiment of the present invention. The automatic transfer molding apparatus comprises: a mold (14, 15); an injection plunger 17 or other means for injecting a thermosetting resin, such as epoxy or silicone; a hydraulic press 31 or other means for driving the plunger 17; a pressure-sensitive element 25, e.g., a strain gage, or other means for detecting the internal pressure of the resin 18 in the mold (14, 15); and a control unit and hydraulic pressure controller or other means controlling the hydraulic pressure.

On the outer circumference of the injection plunger 17 are provided two grooves 22a and 22b, as in the prior art. A cylindrical cavity 24 is formed inside the injection plunger 17. The cylindrical cavity 24 penetrates the center portion of the plunger 17 to an end position slightly spaced from the end surface 27 of the plunger 17 contacting the molten resin 18. The distance between the end position and the end surface 27 is suitably selected from a range of 0.5 to 1.0 mm in accordance with the size of the plunger 17 and the pressure applied to the resin 18. At the bottom of the cavity 24 is provided the pressure-sensitive element 25 and a converter 26. This bottom portion is extremely thin and easily deforms under pressure, which deformation is detected by the pressure-sensitive element 25. The converter 26 converts this to an electric signal. The conversion signal is input to the control unit and is compared to a preset level of pressure. Then, the obtained signal in the control unit is input to the hydraulic pressure controller.

Consequently, the actual internal pressure of the molten resin 18 is always monitored. The injection pressure of the plunger is compensated according to the monitored pressure to automatically maintain a constant pressure of the resin 18. The relationship between the pressure of the resin and the number of shots according to the present invention is shown in FIG. 7.

Figure 7:
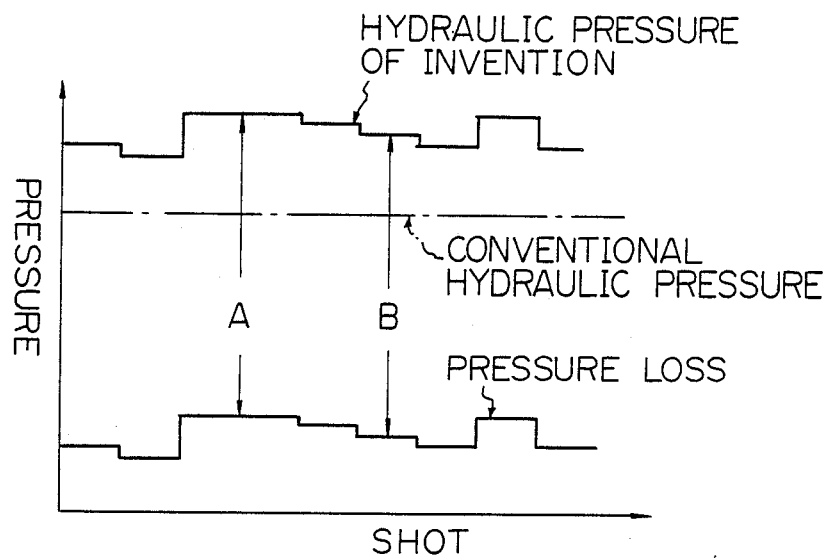
FIG. 7 is a diagram of a relationship between pressures of the resin and the number of shots of resin according to the present invention.

As shown in FIG. 7, the hydraulic pressure is compensated in accordance with the pressure loss. Thus, pressures A and B are maintained constant.

The above-mentioned transfer molding method and apparatus can be used not only in the production of mold-sealed type semiconductor devices, but also for other articles obtained by using various devices wherein a molding operation is carried out.

The pressure-sensitive element may also be provided below the bottom surface of the cull 16 as element 29. Two or more pressure-sensitive elements may also be provided. For example, one is provided in the lower portion of the plunger and others are provided in other portions of the mold.

I claim:

1. A transfer molding method for molding resin articles in a mold having a plurality of cavities. and a pot communicating with said cavities via a runner, said method comprising the steps of:

(a) charging a thermosetting resin into said pot;
   (b) transferring said thermosetting resin from said pot to each of said cavities by applying pressure to said thermosetting resin by plunger means movable in said pot;
   (c) before said resin reaches said cavity, detecting internal pressure within the area defined by said pot and the end surface of the plunger directly by detecting means and controlling the pressure applied to said plunger means in response to the internal pressure detected by the detecting means so that friction between the plunger and the wall of the pot is compensated for and said internal pressure in said pot is maintained constant during said transferring step; and
   (d) repeating steps (a)–(c) a plurality of times, wherein the inner pressure is detected every time the transfer step is carried out and the pressure applied to the plunger is controlled so that the inner pressure during each transfer step is maintained constant.

2. The method according to claim 1, wherein said means for detecting said internal pressure in said pot comprises a pressure sensitive element.

3. The method according to claim 2, wherein said control means comprises a control unit and a hydraulic pressure controller.

4. The method according to claim 3, wherein said thermosetting resin is epoxy resin.

5. The method according to claim 3, wherein said thermosetting resin is silicone resin.

6. The method according to claim 3, wherein said pressure sensitive element is a strain gage.

7. A transfer molding apparatus comprising:

(a) a mold having a plurality of cavities;

(b) a pot communicating with each of said plurality of cavities via a runner;

(c) plunger means movable in said pot and having an end surface for pressing a thermosetting resin charged into said pot a plurality of times;

(d) driving means for applying a pressure to said plunger means to move said plunger, causing said resin to be transferred out of the pot, along the runner and into the plurality of cavities;

(e) means for detecting, before said resin reaches the plurality of cavities, internal pressure within the area defined by said pot and the end surface of the plunger directly, and for generating a signal corresponding to said internal pressure; and (f) means for controlling the pressure applied to said plunger means by said driving means in response to said signal from said detecting means;

wherein friction between the plunger and the wall of the pot is compensated for and said internal pressure is maintained constant each time said thermosetting resin is transferred from said pot to each of said plurality of cavities by the plunger.

8. The apparatus according to claim 7, wherein said detecting means is a pressure sensitive element.

9. An apparatus according to claim 7, wherein said detecting means is provided in said plunger means near the end surface thereof.

10. The apparatus according to claim 8, wherein said pressure sensitive element is a strain gage.

11. The apparatus according to claim 9, wherein said detecting means is provided in a cavity formed centrally in said plunger means.

12. The apparatus according to claim 11, wherein said detecting means further comprises a converter located in said cavity in said plunger means which is operatively connected between said pressure sensitive element and said control means.

13. An apparatus according to claim 7, wherein said detecting means is provided in the mold near said resin, opposite said plunger means.

14. The apparatus according to claim 7, wherein said control means comprises a control unit and a hydraulic pressure controller.

15. The apparatus according to claim 7, wherein said detecting means is provided in said plunger means near said end surface thereof and in said mold near said resin, opposite said plunger means.

16. The apparatus according to claim 7, wherein said driving means is a hydraulic press.

17. The apparatus according to claim 16, wherein said thermosetting resin is epoxy resin.

18. The apparatus according to claim 16, wherein said thermosetting resin is silicone resin.

* * * * *